United States Patent
Thai et al.

(10) Patent No.: US 9,430,297 B2
(45) Date of Patent: Aug. 30, 2016

(54) LOAD BALANCING OF ADAPTERS ON A MULTI-ADAPTER NODE

(75) Inventors: Hung Q. Thai, Bronx, NY (US); Hanhong Xue, Albany, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1539 days.

(21) Appl. No.: 12/334,624

(22) Filed: Dec. 15, 2008

(65) Prior Publication Data

US 2010/0153964 A1     Jun. 17, 2010

(51) Int. Cl.
| | | |
|---|---|---|
| G06F 15/16 | (2006.01) | |
| H04L 12/28 | (2006.01) | |
| G06F 9/50 | (2006.01) | |
| G06F 9/54 | (2006.01) | |

(52) U.S. Cl.
CPC ............ G06F 9/5083 (2013.01); G06F 9/541 (2013.01)

(58) Field of Classification Search
CPC ... H04L 67/1023; G06F 9/5083; G06F 9/541
USPC ......................................... 709/250; 370/255
See application file for complete search history.

(56) References Cited

U.S. PATENT DOCUMENTS

| | | | | |
|---|---|---|---|---|
| 6,078,957 | A * | 6/2000 | Adelman et al. ............. | 709/224 |
| 6,229,538 | B1 * | 5/2001 | McIntyre et al. ............. | 715/734 |
| 6,381,218 | B1 * | 4/2002 | McIntyre et al. ............. | 370/245 |
| 6,470,389 | B1 * | 10/2002 | Chung et al. ................ | 709/227 |
| 6,567,377 | B1 * | 5/2003 | Vepa et al. .................... | 370/230 |
| 6,587,866 | B1 * | 7/2003 | Modi et al. ................... | 718/105 |
| 6,631,422 | B1 * | 10/2003 | Althaus et al. ............... | 709/250 |
| 6,658,018 | B1 * | 12/2003 | Tran et al. .................... | 370/465 |
| 7,480,706 | B1 * | 1/2009 | Hooper et al. ................ | 709/223 |
| 7,536,693 | B1 * | 5/2009 | Manczak et al. ............. | 718/105 |
| 7,787,370 | B1 * | 8/2010 | Aweya et al. ................. | 370/230 |
| 2002/0133594 | A1 * | 9/2002 | Syvanne ....................... | 709/226 |
| 2003/0067913 | A1 * | 4/2003 | Georgiou et al. ............. | 370/389 |
| 2005/0038878 | A1 * | 2/2005 | McGee et al. ................ | 709/220 |
| 2005/0044227 | A1 * | 2/2005 | Haugh et al. ................. | 709/226 |
| 2005/0154860 | A1 * | 7/2005 | Arimilli et al. ............... | 712/216 |
| 2005/0210321 | A1 * | 9/2005 | Bai et al. ........................ | 714/13 |
| 2006/0112032 | A1 * | 5/2006 | Bakke et al. .................. | 706/16 |
| 2006/0146821 | A1 * | 7/2006 | Singh et al. .................. | 370/390 |
| 2006/0203846 | A1 * | 9/2006 | Davis ............................ | 370/466 |
| 2007/0110087 | A1 * | 5/2007 | Abel et al. .................... | 370/412 |
| 2007/0195952 | A1 * | 8/2007 | Singanamala ................. | 380/37 |
| 2008/0040454 | A1 * | 2/2008 | Banerjee et al. .............. | 709/219 |
| 2008/0195754 | A1 * | 8/2008 | Cuomo et al. ................ | 709/238 |
| 2008/0256228 | A1 * | 10/2008 | Fellenstein ............... | G06F 9/50 709/223 |
| 2008/0285441 | A1 * | 11/2008 | Abdulla et al. ............... | 370/225 |
| 2008/0285472 | A1 * | 11/2008 | Abdulla et al. ............... | 370/250 |
| 2008/0288620 | A1 * | 11/2008 | Goff et al. .................... | 709/223 |

* cited by examiner

*Primary Examiner* — Philip Chea
*Assistant Examiner* — Wing Ma
(74) *Attorney, Agent, or Firm* — Damion Josephs, Esq.; Matthew M. Hulihan, Esq.; Heslin Rothenberg Farley & Mesiti P.C.

(57) ABSTRACT

Load balancing of adapters on a multi-adapter node of a communications environment. A task executing on the node selects an adapter resource unit to be used as its primary port for communications. The selection is based on the task's identifier, and facilitates a balancing of the load among the adapter resource units. Using the task's identifier, an index is generated that is used to select a particular adapter resource unit from a list of adapter resource units assigned to the task. The generation of the index is efficient and predictable.

21 Claims, 3 Drawing Sheets

LOAD BALANCING OF ADAPTERS ON A MULTI-ADAPTER NODE

This invention was made with Government support under Agreement No. HR0011-07-9-0002 awarded by DARPA. The Government has certain rights in the invention.

TECHNICAL FIELD

This invention relates, in general, to improving performance within a communications environment, and in particular, to performing load balancing among adapters on a multi-adapter node of the communications environment.

BACKGROUND OF THE INVENTION

In an effort to provide reliability, redundancy and improvement of aggregate bandwidth within a communications environment, multiple adapters are installed on the nodes of the environment. The adapters are used for interconnection of nodes, storage and communications networks. Each adapter on a node includes a plurality of adapter resource units (i.e., portions of adapter memory; a.k.a., ports) that are assignable to tasks executing on that node.

A task in a message-passing job is allocated with a fixed set of adapter resource units, identified by an adapter's id and its logical port number, to send and receive data. It is currently the design choice of the resource scheduler in the communications stack that the adapter resource units for each task be distributed across all available adapters on the node for data striping, reliability and optimization of aggregate bandwidth. However, in order to achieve optimal aggregate bandwidth for all tasks running on the same node, each task must choose a single one of the allocated adapter resource units to use as its primary port to send FIFO (first in, first out) data. This design choice has proven to present a problem with balancing loads on the adapters/ports.

Sub-optimal choices from individual tasks running on the same node can result in a heavy load on some adapters/ports and less load on others, since some relatively large number of tasks on the same node might select an adapter resource unit that happens to be on one particular adapter resulting in a heavy load on that one particular adapter and inefficient utilization of other adapters. This compromises the goal of achieving good aggregate performance.

SUMMARY OF THE INVENTION

Based on the foregoing, a need exists for a capability that facilitates load balancing among adapters of a multi-adapter node. A need exists for a capability that enables tasks running on the same node to efficiently and predictably select an adapter resource unit from a plurality of adapter resource units. A need exists for a capability that enables tasks running on the same node to efficiently and predictably select an adapter resource unit to use as its primary port, such that the load among the adapters is balanced, particularly as it pertains to selection of primary ports.

The shortcomings of the prior art are overcome and additional advantages are provided through the provision of a method of facilitating load balancing in a communications environment. The method includes, for instance, selecting, by a task executing on a node of the communications environment, an adapter resource unit from a plurality of adapter resource units assigned to that task, the selecting performing one or more calculations using an identifier of the task to obtain a selection indicator to be used in selecting the adapter resource unit for the task, wherein the selection indicator obtained from performing the one or more calculations is predictable for the task; and using by the task the selected adapter resource unit as its primary port for sending data, and wherein the selecting facilitates a balancing of the load across adapter resources of the node.

Systems and program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for performing load balancing within a communications environment. In particular, a capability is provided that enables each task of a plurality of tasks running on one node to efficiently and predictably select an adapter resource unit to use as its primary port (i.e., primary logical port). The adapter resource unit is selected for a task from an indexed list of allocated adapter resources specific for that task. The selection is based on the task identifier, and is such that the overall workload for the tasks of one job running on that node is spread across the allocated adapters in a balanced manner.

Figure 1A:
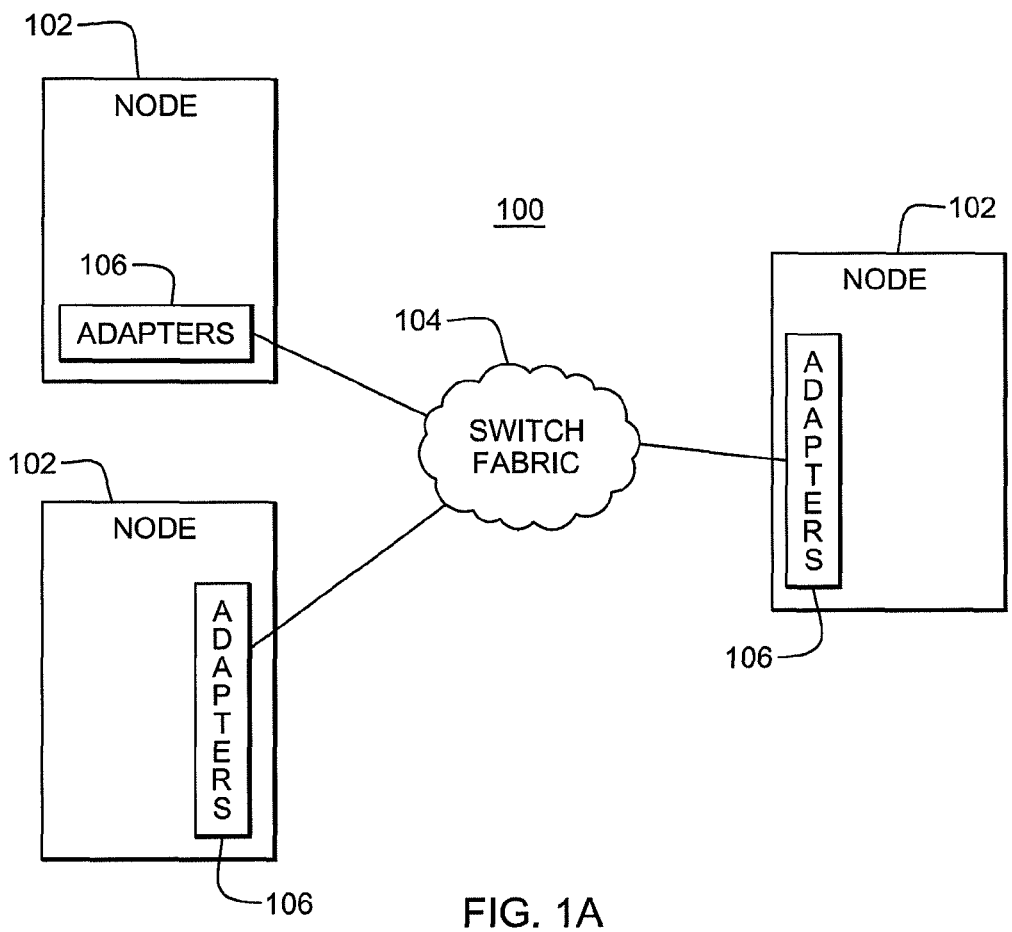
FIG. 1A depicts one embodiment of a communications environment to incorporate and use one or more aspects of the present invention.

One example of a communications environment to incorporate and use one or more aspects of the present invention is described with reference to FIG. 1A. In one example, a communications environment 100 includes a plurality of nodes 102 coupled to one another via one or more connections 104. In this example, each of the nodes is a pSeries® server offered by International Business Machines Corporation. However, in further examples, the nodes can be other than pSeries® servers. Further, in this example, each node includes a plurality of adapters 106, such as Infiniband adapters. The adapters are used for interconnection, including the interconnection of nodes, storage and communications networks. In this example, the adapters are connected to a switch fabric 104; however, in other examples, they may be connected to other types of connections. Further, adapters other than Infiniband adapters may be used. pSeries® is a registered trademark of International Business Machines Corporation, Armonk, N.Y. Other names used herein may be registered trademarks, trademarks or product names of International Business Machines Corporation or other companies.

Figure 1B:
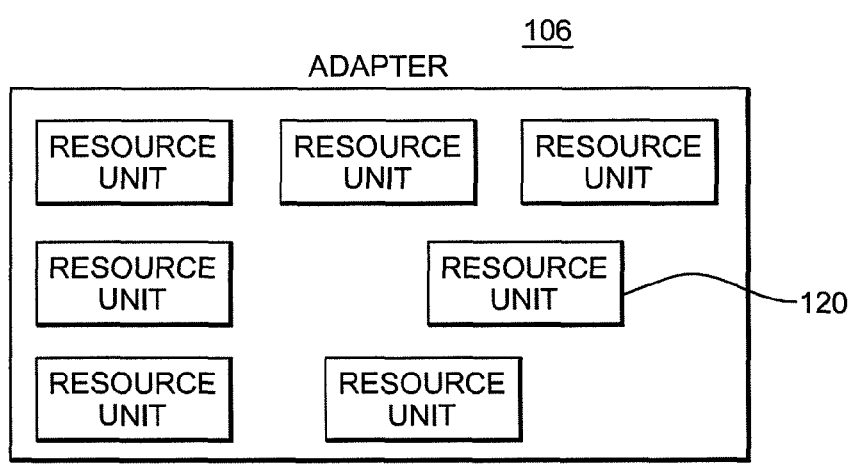
FIG. 1B depicts one example of an adapter of the communications environment of FIG. 1A.

Each adapter 106 includes a plurality of adapter resource units 120 (FIG. 1B) that are assignable to tasks executing within the node. In one example, each task selects a resource unit to use as its primary port. In accordance with an aspect of the present invention, this selection is performed such that the load across the adapter resource units is balanced. One embodiment of the logic associated with performing this balancing is described with reference to FIG. 2. This logic is performed by each task that is to select a primary port.

Figure 2:
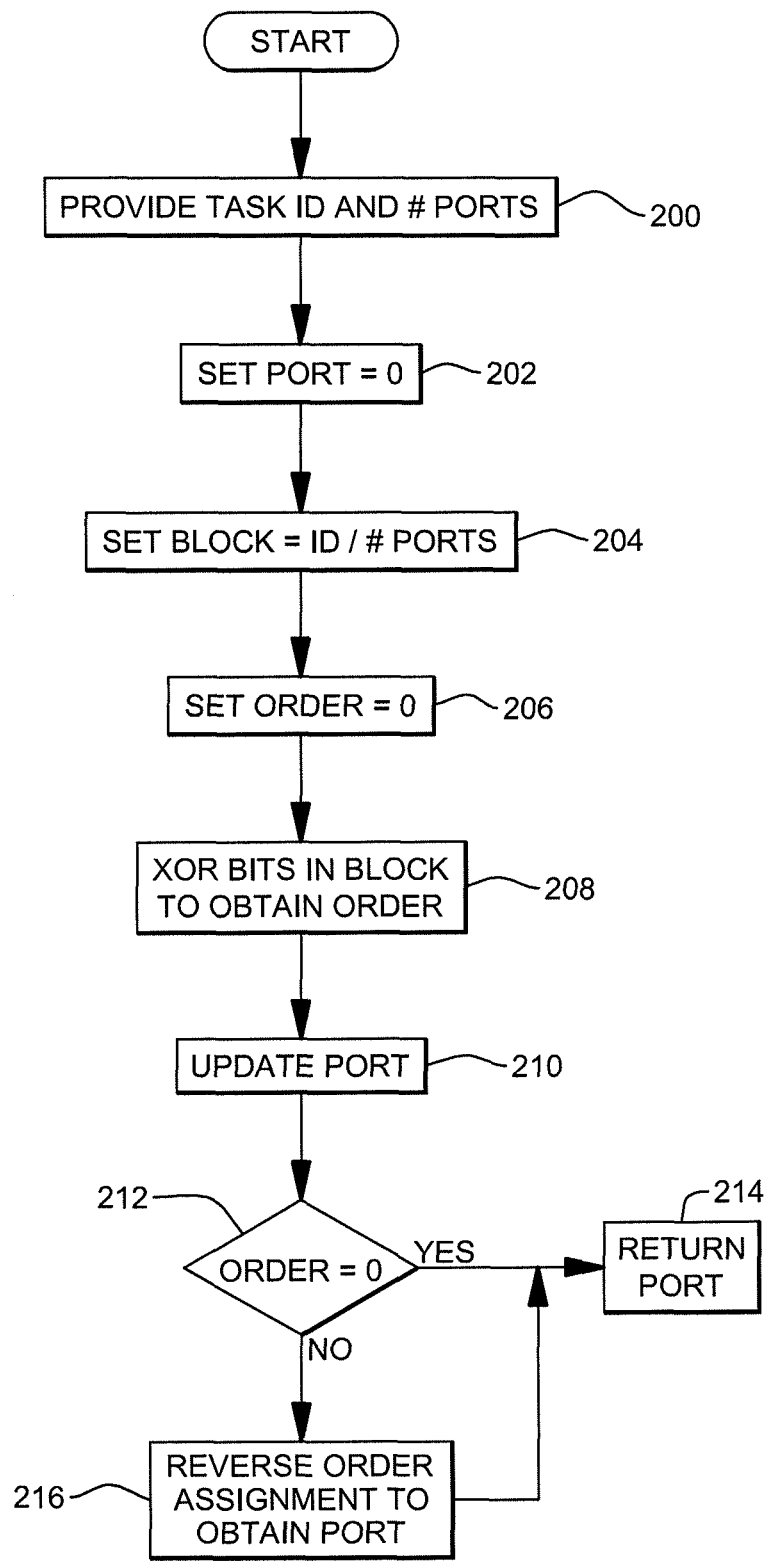
FIG. 2 depicts one embodiment of the logic associated with performing load balancing among a plurality of adapters of a node, in accordance with an aspect of the present invention.

Referring to FIG. 2, initially, a task identifier of the task executing this logic and the number of available ports (resource units) are provided, STEP 200. The task identifier is a unique identifier of the task within the node. It is known locally to the set of tasks running on the node and within the job. In one example, the identifier is in the range of 0 to n-1, where n is the number of tasks of the job running on the node. For example, if there are 16 tasks, the task identifiers are 0 to 15. The number of ports is the number of pre-allocated ports spread out on all the adapters. The number of ports can be any multiple of the number of adapters in the node. For example, if there are 4 adapters, there may be 8, 16, etc. ports.

Additionally, a variable referred to as port is set equal to zero, STEP 202; a variable block is set equal to the identifier divided by the number of ports, STEP 204; and a variable order is set equal to zero, STEP 206. In each of these cases, the initialization is in integer form.

Subsequently, an exclusive OR (XOR) operation is sequentially performed on the bits in block to obtain a value for order, STEP 208. For instance, the first binary number (e.g., 0 or 1) in block is exclusively OR'd with the second binary number in block providing a result. The result is then exclusively OR'd with the third number in block providing a next result; the next result is exclusively OR'd with the next number, and so forth, until all of the binary bits of block have been XOR'd. The resulting value is order.

Additionally, port is updated, as follows: (identifier+1) mod number of ports, where mod is the modulo operation, STEP 210. Thereafter, a determination is made as to whether order is equal to zero, INQUIRY 212. If order is equal to zero, then the port value determined above is returned, STEP 214. However, if order is not equal to zero, then the order assignment is reversed to obtain a value for port, STEP 216. For example, port=number of ports-1-port. Port is then returned, STEP 214.

One embodiment of pseudo-code for this process is as follows:

```
int
_get_ideal_port(identifier, num_ports)
{
  int port=0;
  //identifier: sequential ordinary number of current task,
  //           known locally on node, within the job
  {
    int block=identifier/num_ports;
    int order = 0;
    //xor all bits in block -- a recursive pattern generator
    while (block) {
      order ^=(block & 1);
      block >>=1;
    }
```

```
  }
  port=(identifier + 1) % num_ports;
  if (order) {
    //reverse order assignment
    port=num_ports - 1 - port;
  }
  }
  return port;
}
```

The value, port, that is returned is an index generated specifically for the particular task identified by the task id. It is used to select an adapter resource unit from a list of adapter resources previously allocated to the task. The selected adapter resource unit is to be used as the task's primary port. For instance, assume a node has 4 adapters and each task is pre-allocated 2 adapter resource units per adapter, for a total of num_ports=8. Each task is provided, by a resource scheduler, such as LoadLeveler® offered by International Business Machines Corporation, a pre-allocated list of available resource units for that task. LoadLeveler® is a registered trademark of International Business Machines Corporation.

In this example, Task 0 is assigned:

<adapter3:unit0>, <adapter2:unit0>, <adapter1:unit0>, adapter0:unit0>, <adapter3:unit1>, <adapter2:unit1>, <adapter1:unit1>, <adapter0:unit1>.

Similarly, Task 1 is provided:

<adapter3:unit2>, <adapter2:unit2>, <adapter1:unit2>, adapter0:unit2>, <adapter3:unit3>, <adapter2:unit3>, <adapter1:unit3>, <adapter0:unit3>; etc.

Note that the order of the adapter numbers remains unchanged between lists and between iterations within each list.

After executing the process with its own task identifier and num_ports=8, Task 0 generates port=0; Task 1 generates port=1; etc. The port value is used as an index into that task's pre-allocated list of resource units. Thus, Task 0 will choose index 0 in its list <adapter3:unit0>, as its primary port; Task 1 will choose index 1 in its list <adapter2:unit2>; . . . Task 30 will choose index 6 in its list <adapter1:unit61>; and Task 31 will choose index 7 in its list, <adapter0:unit63>.

As a result, the available adapters are used evenly (as evenly as possible given the configuration and number of tasks) between the tasks on the node. Each task runs the process independently, and by utilizing the unique task identifier (unique within a job on a node), each is provided a unique index to use. This index is used to select a primary port for the task.

Further details regarding one or more aspects of the present invention are provided below, with reference to the following example application:

Assuming the identifiers of the tasks on the same node are $t_0, t_1, t_2 \ldots$, sorted in ascending order, and each task $t_i$ has two adapter resource units $w^i_0, w^i_1$ to choose from. The logic, which is independently executed by the tasks on the same node, generates the same sequence f as f(i)=sequentially XOR of all the bits of i, i=0,1,2, . . . , and task $t_i$ chooses adapter resource unit $w^i_{f(i)}$ to use as its primary port. This is further explained below.

The first 16 elements of the f sequence are given as follows:

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| f(i) | 0 | 1 | 1 | 0 | 1 | 0 | 0 | 1 | 1 | 0 | 0 | 1 | 0 | 1 | 1 | 0 |

Now assume that $w^i_0$ are on adapter 1 for all i and $w^i_1$ are on adapter 2 for all i, which is one valid scenario, then tasks $t_0, t_3, t_5, \ldots$ will be using adapter 1 and tasks $t_1, t_2, t_4, \ldots$ will be using adapter 2. As long as the number of tasks on the node is even, the assignment of tasks to adapters is balanced. Further, if there is only one adapter with 2 links (i.e., physical ports), but $w^i_0$ are on the first link and $w^i_1$ are on the second link, the assignment is still balanced on the two links. (The same sequence can produce balanced assignments for more scenarios, like four links in two networks.) Thus, one or more aspects of the present invention can be used to select a logical port, or a physical port assuming the logical ports are distributed in a balanced manner.

If there are m (m≥2) adapter resource units to choose from, the f sequence is used to produce more generalized F sequences:

$$F_m(i \cdot m + j) = \begin{Bmatrix} j, & f(i) = 0 \\ m - 1 - j, & f(i) = 1 \end{Bmatrix} \text{ for } j = 0, 1, \ldots m - 1.$$

One embodiment of the pseudo-code for this generalized F sequence is described above.

Here are examples of $F_2$, $F_4$ and $F_8$. It can be verified that $F_2(i)=f(i)$.

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| $F_2(i)$ | 0 | 1 | 1 | 0 | 1 | 0 | 0 | 1 | 1 | 0 | 0 | 1 | 0 | 1 | 1 | 0 |
| $F_4(i)$ | 0 | 1 | 2 | 3 | 3 | 2 | 1 | 0 | 3 | 2 | 1 | 0 | 0 | 1 | 2 | 3 |
| $F_8(i)$ | 0 | 1 | 2 | 3 | 4 | 5 | 6 | 7 | 7 | 6 | 5 | 4 | 3 | 2 | 1 | 0 |

It can be observed from the above table that, for example, if there are eight adapter resource units each from a different network/link, the $F_8$ sequence will produce a balanced assignment as long as the number of tasks on a node is a multiple of 8.

This logic is applicable on any network configuration and adapter capacity, i.e., number of ports per adapters, or number of adapters per node. The format of the list of adapter resource units allocated to each task is consistent for all tasks running on the same node.

It can also be verified that each task i will choose a corresponding adapter resource unit in the list of allocated resources in a consistent and predictable way given its identifier i, as long as number of units is constant. On the other hand, by customizing the indexing of the list of adapter resources units to the job's specific workload, programmers of message-passing jobs can benefit from this property to program the job so that tasks with data intensive responsibilities (as opposed to computing intensive tasks) are allocated to adapter resource units on adapters that are most capable of transferring data, i.e., more memory, adapter bus capacity, locality to other resources, etc.

Described in detail herein is a technique that enables each task (or a subset thereof) of a job (e.g., a message passing job) executing on a node to independently choose an adapter resource unit to be used as its primary port for communications (e.g., to send data). This technique improves aggregate bandwidth and balances usage of the available adapters on the system. Also, given that the other factors of the message passing job are constant, the technique can be used to reproduce the same index, thus creating a predictable behavior of any job on any network configuration of the system.

In addition to the above, one or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer usable medium, in which the computer medium comprises one or more aspects of the present invention. The code in combination with the computer system is capable of performing one or more aspects of the present invention.

One or more aspects of the present invention can be included in an article of manufacture (e.g., one or more computer program products) having, for instance, computer readable media. The media has therein, for instance, computer readable program code means or logic (e.g., instructions, code, commands, etc.) to provide and facilitate the capabilities of the present invention. The article of manufacture can be included as a part of a computer system or sold separately.

Figure 3:
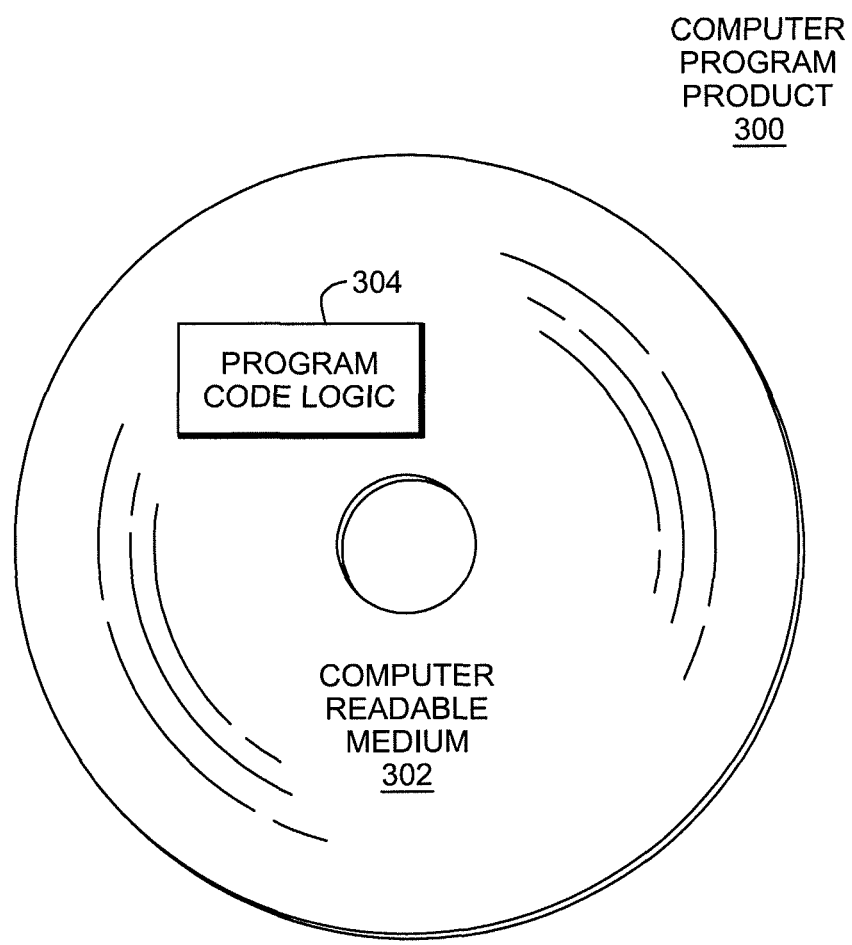
FIG. 3 depicts one embodiment of a computer program product incorporating one or more aspects of the present invention.

One example of an article of manufacture or a computer program product incorporating one or more aspects of the present invention is described with reference to FIG. 3. A computer program product 300 includes, for instance, one or more computer readable media 302 to store computer readable program code means or logic 304 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided that enables a task executing on a node to independently and efficiently choose a primary port to be used in communications. The logic of the capability is repeatable and predictable in that each time the task executes the logic, it will receive the same index (assuming the configuration remains constant), which is used to select a port. This technique provides load balancing among the adapters of the nodes by controlling which port is selected by a particular task. Tasks running on the same node efficiently and predictably select an adapter resource unit from an indexed list of allocated adapter resources based on their specific task identifiers, so that the overall workload for all tasks of one job running on that node is spread across the allocated adapters in a balanced manner.

Although various embodiments are described above, these are only examples. For example, communications environments other than those described herein may include and use one or more aspects of the present invention. For example, nodes other than pSeries® servers may be used and the adapters may be other than Infiniband. Further, the connections can be other than switch fabric connections. Many other variations may also exist. Additionally, more or less adapters and adapter resource units than described herein may be used. Further, a resource scheduler other than LoadLeveler® may be used to pre-allocate the resource units. As a further example, other types of identifiers than those described herein may be used. Many other variations also exist.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating load balancing in a communications environment, said method comprising:

selecting, by an executing task of a job executing on a node of the communications environment, an adapter resource unit from a plurality of adapter resource units assigned to that task, the plurality of adapter resource units being individually available for selection by the task for use by the task as its primary port, and the plurality of adapter resource units being of one or more adapters of the node, said selecting comprising the task performing one or more calculations using an identifier of the task to obtain a selection indicator to be used in selecting the adapter resource unit for the task, the one or more calculations comprising setting the selection indicator based on a modulo operation using the identifier of the task, wherein the identifier of the task uniquely identifies the task within the job, and wherein the selection indicator obtained from performing the one or more calculations is predictable for the task; and using, by the task of the job, the selected adapter resource unit as its primary port for sending data, and wherein the selecting facilitates a balancing of the load across adapter resources of the node.

2. The method of claim 1, wherein the selecting is independently performed by the task irrespective of selections by other tasks executing on the node, and wherein the primary port is a logical port.

3. The method of claim 1, wherein the selection indicator is an index into a list of the plurality of adapter resource units, wherein the adapter resource unit at the indexed location is the selected adapter resource unit to be used as the primary port for the task.

4. The method of claim 1, wherein a list of the plurality of adapter resource units assigned to the task is arranged in a particular format, and the format of the list of the plurality of adapter resource units allocated to each task of a job executing on the node is consistent.

5. The method of claim 1, wherein the selecting comprises:
setting a variable, block, equal to an integer operation of the identifier divided by a number of adapter resource units of the node;
performing an operation on block to obtain a result; and
determining the selection indicator based on the result.

6. The method of claim 5, wherein the operation performed on block comprises a sequential exclusive-OR operation on the bits of block.

7. The method of claim 6, wherein the determining further comprises:
setting the selection indicator to (the identifier +1) modulo the number of adapter resource units to obtain a set selection indicator;
using the set selection indicator, as the selection indicator, in response to the result being one value; and
resetting the selection indicator to the number of adapter resource units minus 1 minus the set selection indicator, in response to the result being another value, and using the reset selection indicator as the selection indicator.

8. The method of claim 7, wherein the one value is zero and the another value is one.

9. The method of claim 1, wherein the identifier is a unique number between 0 to n−1, where n is the number of tasks of a job executing on the node.

10. The method of claim 1, wherein the selecting is performed by each task of the node that is to select a primary port.

11. A computer system for facilitating load balancing in a communications environment, said computer system comprising:
a memory; and
a processor in communications with the memory, wherein the computer system is configured to perform a method, said method comprising:
selecting, by an executing task of a job executing on a node of the communications environment, an adapter resource unit from a plurality of adapter resource units assigned to that task, the plurality of adapter resource units being individually available for selection by the task for use by the task as its primary port, and the plurality of adapter resource units being of one or more adapters of the node, said selecting comprising the task performing one or more calculations using an identifier of the task to obtain a selection indicator to be used in selecting the adapter resource unit for the task, the one or more calculations comprising setting the selection indicator based on a modulo operation using the identifier of the task, wherein the identifier of the task uniquely identifies the task within the job, and wherein the selection indicator obtained from performing the one or more calculations is predictable for the task; and
using, by the task of the job, the selected adapter resource unit as its primary port for sending data, and wherein the selecting facilitates a balancing of the load across adapter resources of the node.

12. The computer system of claim 11, wherein the selection indicator is an index into a list of the plurality of adapter resource units, wherein the adapter resource unit at the indexed location is the selected adapter resource unit to be used as the primary port for the task, and wherein the primary port is a logical port.

13. The computer system of claim 11, wherein a list of the plurality of adapter resource units assigned to the task is arranged in a particular format, and the format of the list of the plurality of adapter resource units allocated to each task of a job executing on the node is consistent.

14. The computer system of claim 11, wherein the selecting comprises:
setting a variable, block, equal to an integer operation of the identifier divided by a number of adapter resource units of the node;
performing an operation on block to obtain a result; and
determining the selection indicator based on the result.

15. The computer system of claim 14, wherein the operation on block comprises a sequential exclusive-OR operation on the bits of block, and the determining further comprises:
setting the selection indicator to (the identifier +1) modulo the number of adapter resource units to obtain a set selection indicator;
using the set selection indicator, as the selection indicator, in response to the result being one value; and
resetting the selection indicator to the number of adapter resource units minus 1 minus the set selection indicator, in response to the result being another value, and using the reset selection indicator as the selection indicator.

16. A computer program product for facilitating load balancing in a communications environment, said computer program product comprising:
a non-transitory computer readable storage medium readable by a processor and storing instructions for execution by the processor for performing a method comprising:
selecting, by an executing task of a job executing on a node of the communications environment, an adapter resource unit from a plurality of adapter resource units assigned to that task, the plurality of adapter resource units being individually available for selection by the task for use by the task as its primary port, and the plurality of adapter resource units being of one or more adapters of the node, said selecting comprising the task performing one or more calculations using an identifier of the task to obtain a selection indicator to be used in selecting the adapter resource unit for the task, the one or more calculations comprising setting the selection indicator based on a modulo operation using the identifier of the task, wherein the identifier of the task uniquely identifies the task within the job, and wherein the selection indicator obtained from performing the one or more calculations is predictable for the task; and using, by the task of the job, the selected adapter resource unit as its primary port for sending data, and wherein the selecting facilitates a balancing of the load across adapter resources of the node.

17. The computer program product of claim 16, wherein the selection indicator is an index into a list of the plurality of adapter resource units, wherein the adapter resource unit at the indexed location is the selected adapter resource unit to be used as the primary port for the task, and wherein the primary port is a logical port.

18. The computer program product of claim 16, wherein a list of the plurality of adapter resource units assigned to the task is arranged in a particular format, and the format of the list of the plurality of adapter resource units allocated to each task of a job executing on the node is consistent.

19. The computer program product of claim 16, wherein the selecting comprises:

setting a variable, block, equal to an integer operation of the identifier divided by a number of adapter resource units of the node;

performing an operation on block to obtain a result; and determining the selection indicator based on the result.

20. The computer program product of claim 19, wherein the operation on block comprises a sequential exclusive-OR operation on the bits of block, and the determining further comprises:

setting the selection indicator to (the identifier +1) modulo the number of adapter resource units to obtain a set selection indicator;

using the set selection indicator, as the selection indicator, in response to the result being one value; and resetting the selection indicator to the number of adapter resource units minus 1 minus the set selection indicator, in response to the result being another value, and using the reset selection indicator as the selection indicator.

21. The method of claim 1, wherein the performing the one or more calculations comprises performing a sequential exclusive-OR operation on elements of a variable obtained based on the identifier of the task, wherein the sequential exclusive-OR operation comprises:

performing an exclusive-OR operation on a first two sequential elements of the variable to obtain an intermediate result;

updating the intermediate result by performing an exclusive-OR operation on the intermediate result and a next element of the variable, and storing the result as the intermediate result; and repeating the updating the intermediate result for one or more additional elements of the variable.

* * * * *